United States Patent
Kalb et al.

(10) Patent No.: US 8,496,568 B2
(45) Date of Patent: Jul. 30, 2013

(54) ONE-TOUCH ADAPTER WITH CODE PINS FOR USE IN AUTOMATED HANDLING EQUIPMENT

(75) Inventors: James R. Kalb, Petersburg, MI (US); Anthony Jenkins, Fort Washington, MD (US); Michael A. Filipiak, Ann Arbor, MI (US); Timothy John Key, Onsted, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 1214 days.

(21) Appl. No.: 12/306,288

(22) PCT Filed: Jul. 26, 2007

(86) PCT No.: PCT/US2007/074426
§ 371 (c)(1),
(2), (4) Date: Dec. 23, 2008

(87) PCT Pub. No.: WO2008/014376
PCT Pub. Date: Jan. 31, 2008

(65) Prior Publication Data
US 2009/0286662 A1 Nov. 19, 2009

Related U.S. Application Data

(60) Provisional application No. 60/833,765, filed on Jul. 27, 2006.

(51) Int. Cl.
*B23Q 3/155* (2006.01)
(52) U.S. Cl.
USPC .............................................. 483/19; 901/30

(58) Field of Classification Search
USPC .................... 483/19, 901; 901/30, 36, 39, 41, 901/42; 414/729; 227/70; 29/242, 243, 747, 29/456; 439/680; 279/77
See application file for complete search history.

(56) References Cited

U.S. PATENT DOCUMENTS

| | | | | |
|---|---|---|---|---|
| 3,081,494 A | * | 3/1963 | Darnell | ......................... 249/160 |
| 4,595,250 A | | 6/1986 | Joly et al. | |

(Continued)

FOREIGN PATENT DOCUMENTS

| | | | |
|---|---|---|---|
| JP | 60236474 A | 11/1985 | |
| JP | 61124074 A | 6/1986 | |

(Continued)

OTHER PUBLICATIONS

Search Report and written Opinion mailed on May 23, 2008 for PCT/US07/74426.

(Continued)

*Primary Examiner* — Eric A Gates
*Assistant Examiner* — Paul M Janeski
(74) *Attorney, Agent, or Firm* — Young Basile Hanlon & MacFarlane P.C.

(57) ABSTRACT

An adapter assembly (28) for use in an automated handling equipment system includes a first component and a second component that is selectively mountable to the first component. At least one first code member (82) is associated with the first component and at least one second code member (84) is associated with a second component. The at least one first code member and the at least one second code member have a variable orientation relative to each other that controls whether the second component can be mounted to the first component.

19 Claims, 6 Drawing Sheets

U.S. PATENT DOCUMENTS

| | | | |
|---|---|---|---|
| 4,636,135 A * | 1/1987 | Bancon | 414/730 |
| 4,875,275 A * | 10/1989 | Hutchinson et al. | 279/93 |
| 5,018,266 A | 5/1991 | Hutchinson et al. | |
| 5,779,609 A | 7/1998 | Cullen et al. | |
| 6,116,966 A | 9/2000 | Little et al. | |
| 6,491,612 B1 | 12/2002 | Kurup et al. | |
| 6,533,594 B1 | 3/2003 | Kurup | |
| 6,569,071 B1 * | 5/2003 | Koren et al. | 483/32 |
| 6,931,718 B2 | 8/2005 | Isogai et al. | |
| 2003/0208898 A1 * | 11/2003 | Geary | 29/456 |

FOREIGN PATENT DOCUMENTS

| | | | |
|---|---|---|---|
| JP | 01295780 A * | 11/1989 | |
| JP | 6039764 A | 2/1994 | |
| JP | 7075988 A | 3/1995 | |
| JP | 10156777 A | 6/1998 | |

OTHER PUBLICATIONS

International Preliminary Report on Patentability dated Mar. 9, 2009.

* cited by examiner

ONE-TOUCH ADAPTER WITH CODE PINS FOR USE IN AUTOMATED HANDLING EQUIPMENT

RELATED APPLICATIONS

This application claims priority to U.S. Provisional Patent Application No. 60/833,765 which was filed Jul. 27, 2006.

BACKGROUND OF THE INVENTION

This invention relates to adapter assemblies and, more particularly, to adapter assemblies that provide relatively easy assembly and disassembly in combination with foolproof attachment for various different types of tooling in automated handling equipment.

Multifunction adapter assemblies are widely known and used in transfer press equipment and the like to move objects in an industrial setting. Typically, the adapter assembly is mounted within the equipment to support tooling used to move the objects.

Presently, some adapter assemblies include a stem portion that is received into an opening in a mounting receiver. The stem portion and the opening include mating surfaces that limit relative rotation between the adapter and the mounting receiver. The adapter is then secured to the mounting receiver using a latch.

One drawback of such adapter assemblies is that the mating surfaces allow rotational play between the mounting receiver and the adapter, which creates looseness in the connection. Furthermore, the adapter can be received into the mounting receiver in any of various different orientations, only one of which may be desirable. Thus, an adapter assembly that prevents relative movement between the mounting receiver and the adapter and that provides a foolproof connection between the mounting receiver and the adapter is needed.

SUMMARY OF THE INVENTION

An example adapter assembly for use in an automated handling equipment system includes a first component and a second component that is selectively mountable to the first component. At least one first code member is associated with the first component and at least one second code member is associated with a second component. The at least one first code member and the at least one second code member have variable orientations relative to each other that controls whether the second component can be mounted to the first component.

In another aspect, an example method of assembling an adapter for use in an automated handling equipment system includes the steps of establishing at least one first code member in one of a plurality of possible orientations with a first component and establishing at least one second code member in one of a plurality of possible orientations with a second component. A relative orientation between the at least one first code member and the at least one second code member is established to control whether the second component can be mounted to the first component.

DETAILED DESCRIPTION OF THE PREFERRED EMBODIMENT

Figures 1, 2:
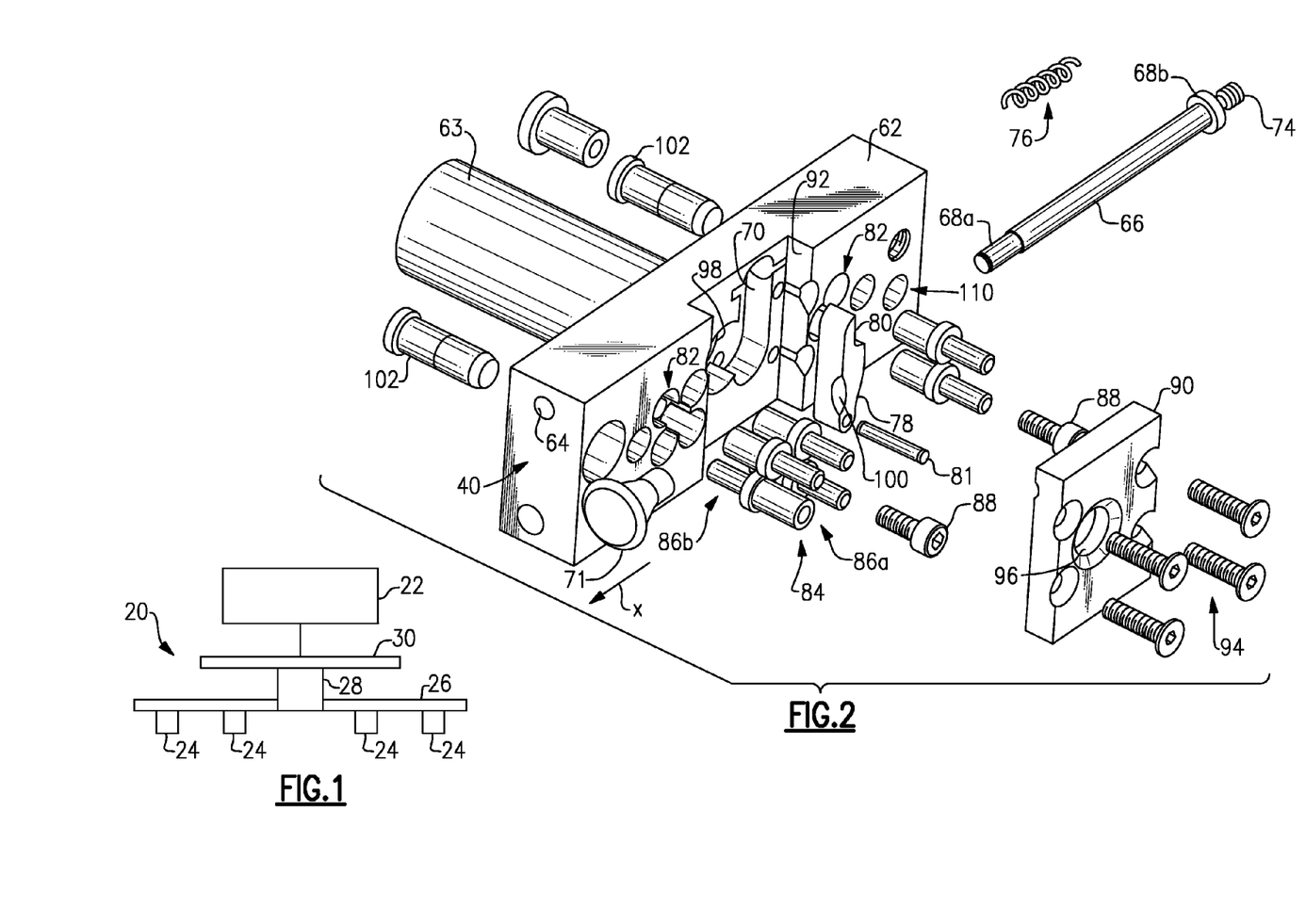
FIG. 1 illustrates selected portions of an example automated handling equipment system having an adapter assembly.
FIG. 2 illustrates an exploded view of an example adapter receiver of an adapter assembly.
Figure 3:
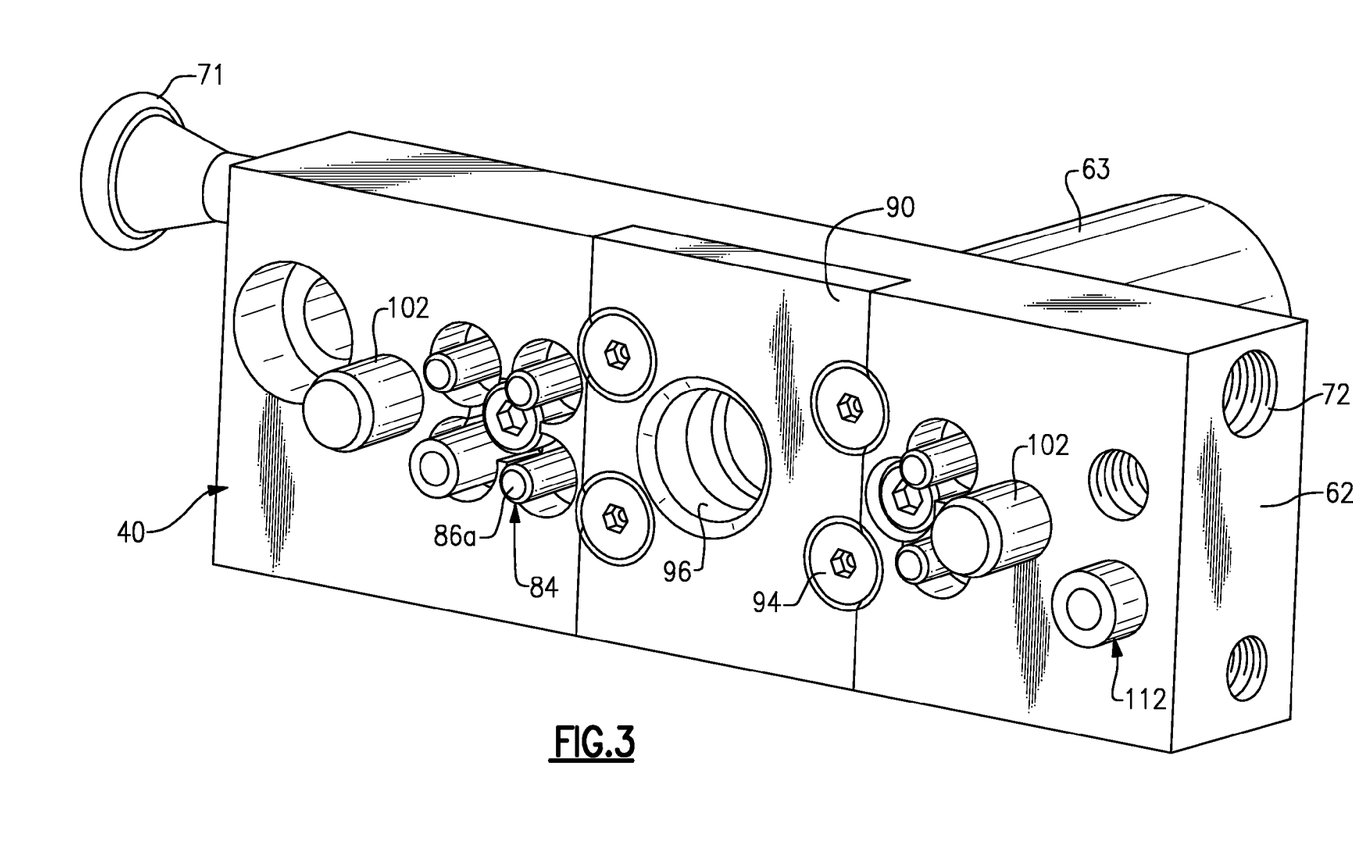
FIG. 3 illustrates the adapter receiver of FIG. 2 in an assembled condition.
Figure 4:
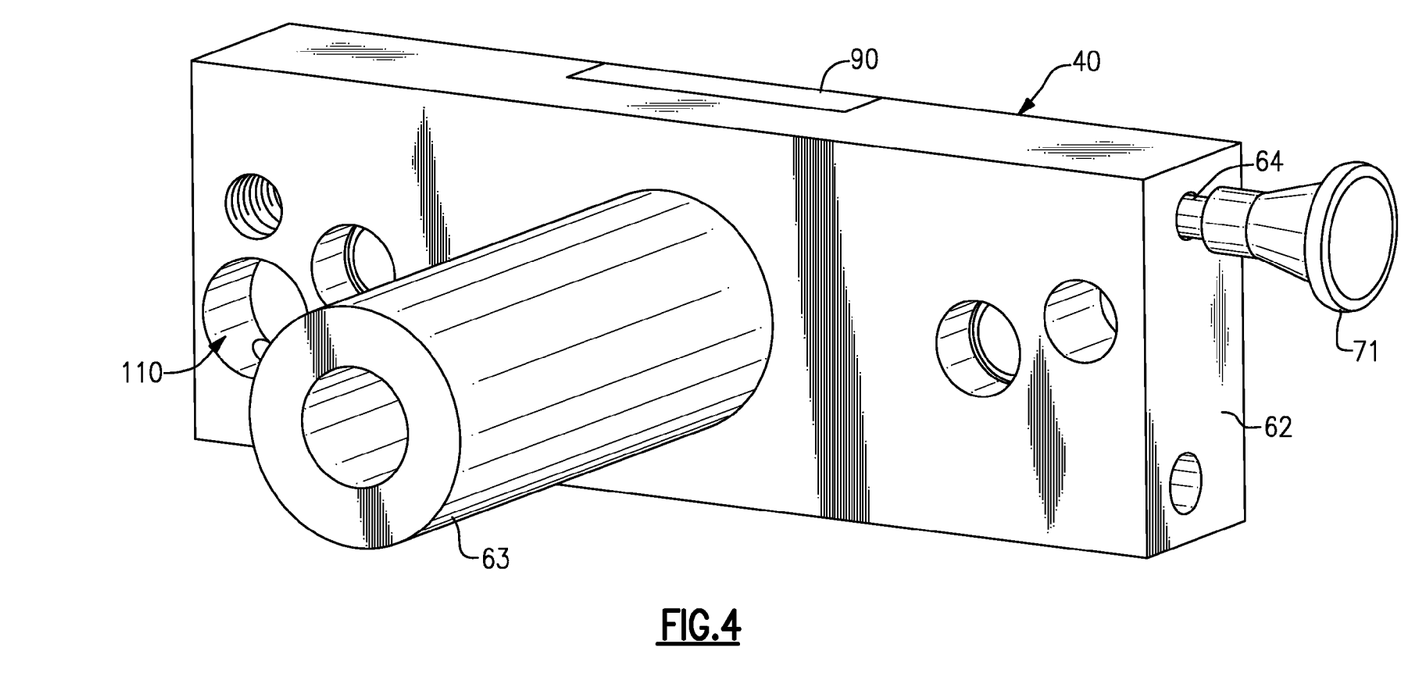
FIG. 4 illustrates a rear view of the adapter receiver.

FIG. 1 schematically illustrates selected portions of an example automated handling equipment system 20. Although a particular configuration is shown, it is to be understood that the illustration is one example of any of a variety of configurations of automated handling equipment and the like. In this example, the automated handling equipment system 20 includes an automated machine 22 for moving one or more tools 24 mounted thereto. For example, the tools 24 may include grippers, shovels, suction cups, or the like for supporting objects as the objects are moved from one location to another. In the disclosed example, the tools 24 are mounted on a support rod 26, which is in turn mounted on an adapter assembly 28. In this example, the adapter assembly 28 is mounted to a common rail 30 that is movable by the automated machine 22.

Figure 5:
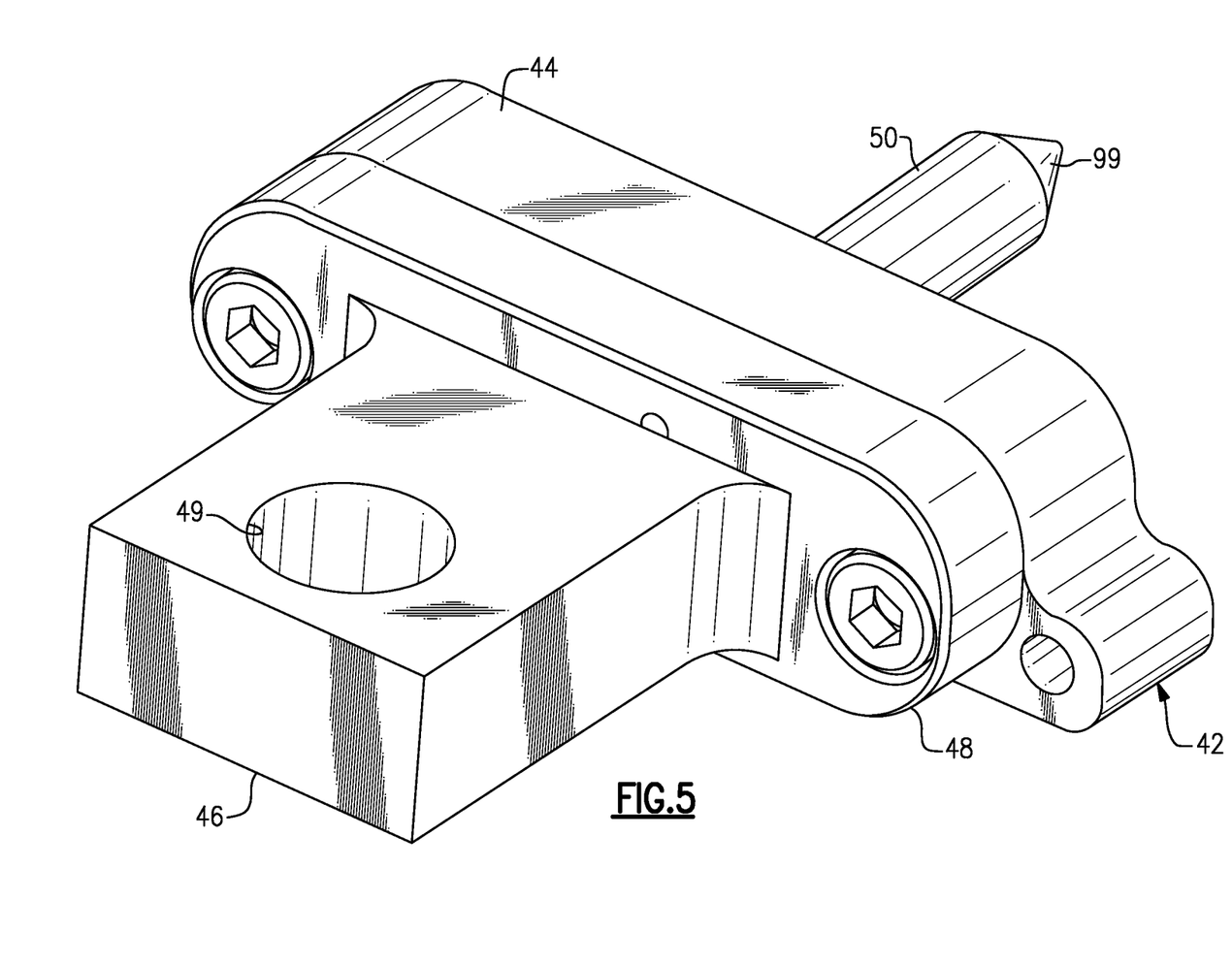
FIG. 5 illustrates an assembled view of an example adapter of an adapter assembly.

In the disclosed example, the adapter assembly 28 includes a variety of different components. FIGS. 2-7 will now be explained to illustrate one example of the adapter assembly 28. Although a particular configuration and shape is shown, it is to be understood that, in other examples, alternative configurations and shapes are contemplated. As can be appreciated from the figures, the adapter assembly 28 includes an adapter receiver 40 for receiving and securing an adapter 42 thereto. In the disclosed example, the adapter 42 includes three distinct components that are secured together. As shown in FIG. 5, the adapter 42 includes a guide plate 44, an adapter end 46, and a mounting plate 48 secured between the guide plate 44 and the adapter end 46. In this example, the adapter end 46 includes an opening 49 there through for receiving and supporting the support rod 26 in a known manner. The guide plate 44 includes a stem 50 having a circumferential groove 52 for securing the adapter 42 to the adapter receiver 40, as will be explained below.

As can be appreciated from the exploded view shown in FIG. 2, the adapter receiver 40 includes a body 62 having a stem 63 for securing the adapter receiver 40 to the common rail 30. Optionally, the body 62 includes a different type of known mounting stem or is secured directly to the common rail 30 using fasteners or the like. The body 62 includes a latch bore 64 that extends at least partially there through. The latch bore 64 receives a latch pin 66 having a first end 68a and a second end 68b. The second end 68b extends through the latch bore 64 and into a recessed portion 70 of the body 62. A handle 71 is received onto the first end 68a to facilitate movement of the latch pin 66.

Opposite from the latch bore 64, the body 62 includes a threaded bore 72 (FIG. 3) for receiving a set screw 74. A spring 76 is received within the threaded bore 72 such that the set screw 74 holds the spring 76 in contact with a latch lever 78 within the recessed portion 70. The spring 76 exerts a force on an end 80 of the latch lever 78 to pivotally bias the latch lever 78 in the x-direction about a pivot pin 81.

In the disclosed example, each of the body 62 and the guide plate 44 (of the adapter 42) also includes code pin bores 82 that extend at least partially through the thicknesses thereof.

In this example, the body 62 and guide plate 44 each include six code pin bores 82 for receiving corresponding code pins 84 (code members). In this example, the code pins 84 have a male end 86a and a female end 86b and can be secured within the bores 82 in two different orientations. In one orientation, the male end 86a faces outwards, and in the second orientation, the female end 86b faces outwards, as will be explained below. The code pins 84 are held within the code pin bores 82 using screws 88.

The plate 90 is received into another recessed portion 92 of the body 62 to secure the latch lever 78 within the recessed portion 70. The plate 90 is secured in place using fasteners 94. The plate 90 includes an opening 96 that aligns with an opening 98 within the body 62. The openings 96, 98 receive the stem 50 of the adapter 42.

Figure 6:
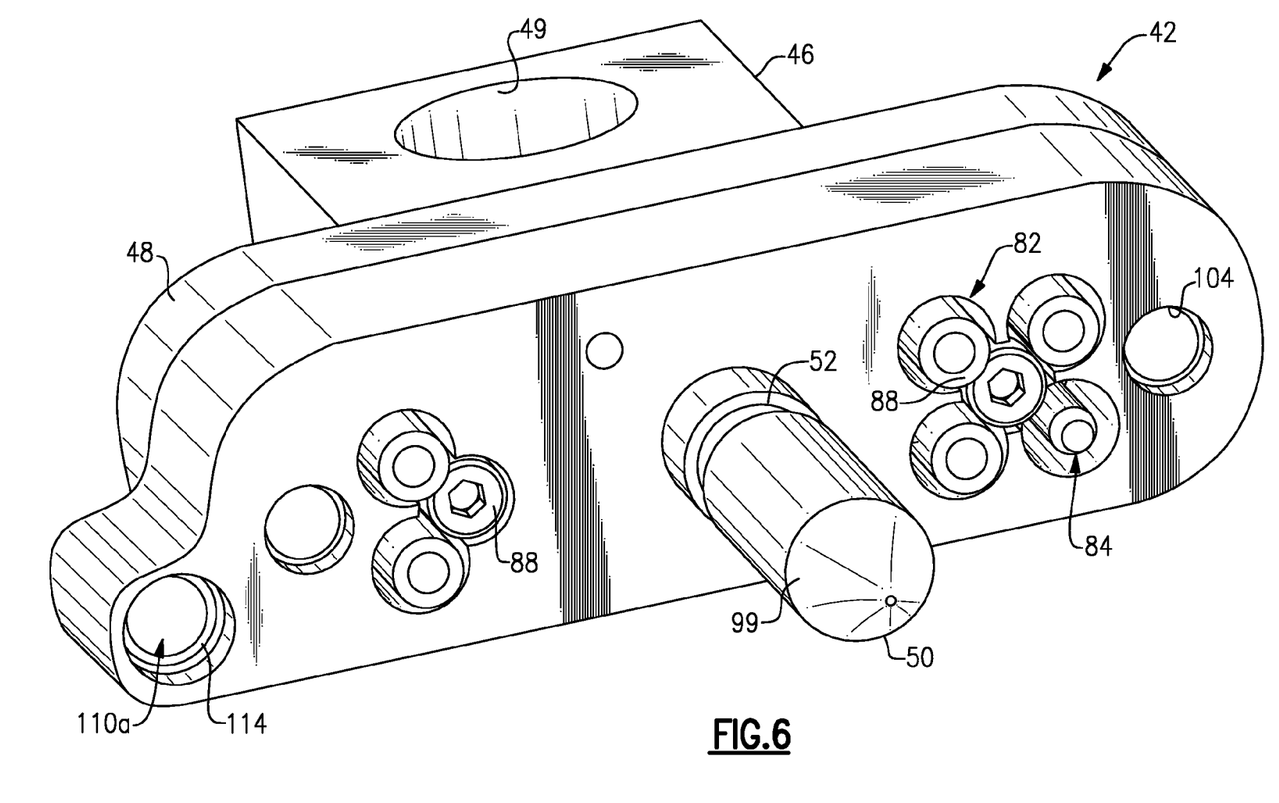
FIG. 6 illustrates a rear view of the example adapter.
Figure 7:
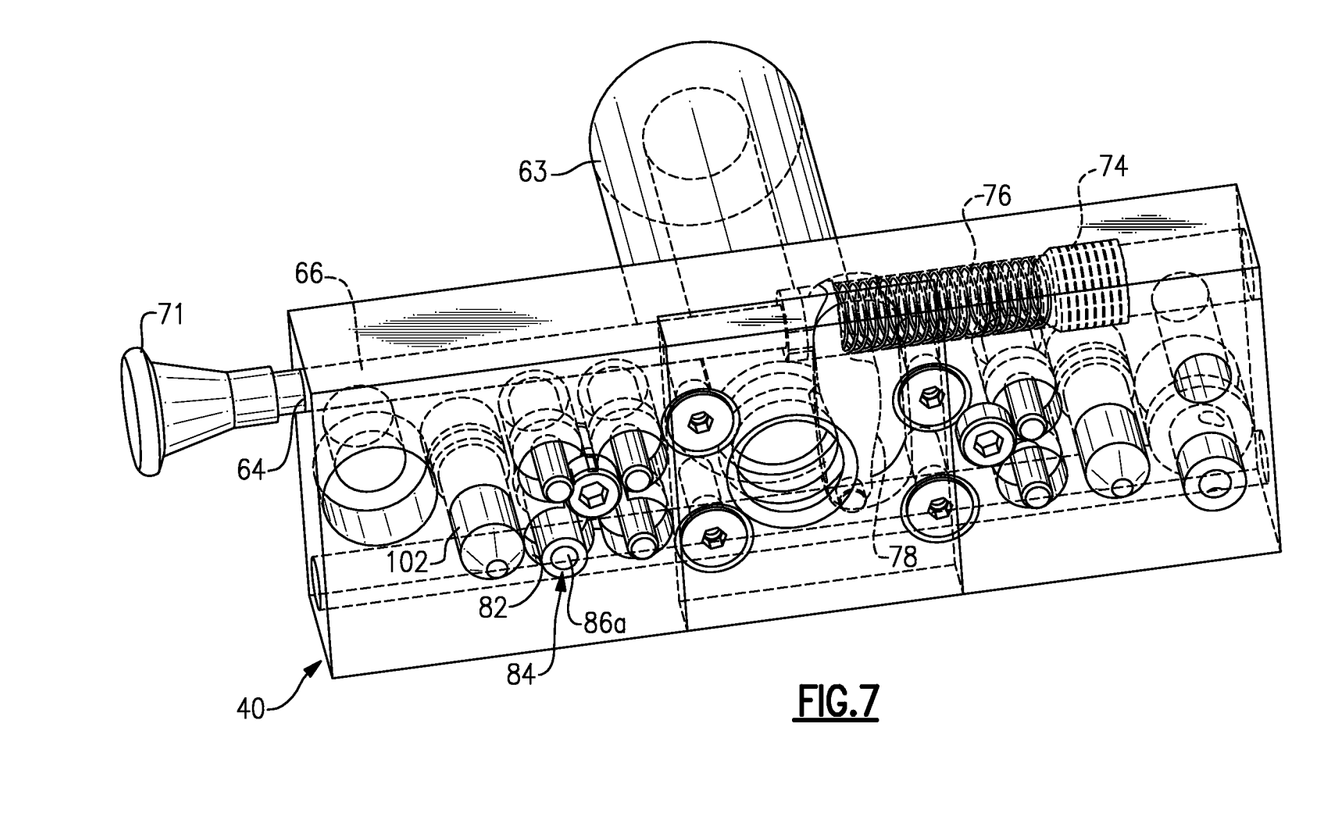
FIG. 7 illustrates a transparent view of the example adapter receiver.

When the stem 50 is inserted through the openings 96, 98, the stem 50 encounters the latch lever 78. As best seen in FIG. 6, the stem 50 includes an angled end, such as a cone-shaped tip 99, that engages a cutout 100 within the edge of the latch lever 78. This allows the stem 50 to move the latch lever 78 against the biasing force of the spring 76 to allow the stem 50 to extend through the opening 98. As the stem 50 extends into the opening 98, the biasing force of the spring 76 moves the latch lever 78 into the circumferential groove 52 of the stem 50 to lock the adapter 42 and the adapter receiver 40 together. To release the stem 50, one moves the latch pin 66 against the end 80 of the latch lever 78 to rotate the end 80 of the latch lever 78 against the biasing force of the spring 76. The latch lever 78 retracts out of the circumferential groove 52 to thereby allow the stem 50 and adapter 42 to be separated from the adapter receiver 40.

In the disclosed example, the adapter receiver 40 also includes locating pins 102 that are received within locating bores 104 within the guide plate 44 of the adapter 42. In this example, two locating pins 102 are used to provide a three-point connection (the two locating pins 102 and the stem 50) between the adapter 42 and the adapter receiver 40. This provides the benefit of resisting relative rotational movement between the adapter 42 and the adapter receiver 40, as well as resisting out-of-plane bending of the adapter 42.

As can be appreciated from the figures, the code pins 84 can be inserted and secured within the code pin bores 82 in either of the two different orientations (i.e., with the male end 86a or the female end 86b facing outwards). Thus, for a given number N of code pins 84 and a given number X of possible orientations, there are $X^N$ possible code pin arrangements on each of the adapter receiver 40 and the adapter 42. Given this description, one of ordinary skill in the art will recognize that code pins having more than two orientations could be used instead of the disclosed code pins 84 and that more or fewer than six code pins 84 can be used to meet their particular needs.

When the adapter 42 is received onto the adapter receiver 40, the code pins 84 within the adapter receiver 40 and the code pins 84 within the adapter 42 must have corresponding code pin arrangements in order for the adapter 42 to mount to the adapter receiver 40. That is, a particular code pin 84 in the adapter 42 that aligns with a corresponding code pin 84 within the adapter receiver 40 must have a male-female correspondence in order for the adapter 42 to be received completely onto the adapter receiver 40. If both male ends 86a of corresponding code pins 84 on the adapter receiver 40 and the adapter 42 face outwards, the adapter 42 cannot mount to the adapter receiver 40. Thus, by rearranging the code pins 84 into different code pin arrangements, one may configure $2^6$ different combinations of code pins 84 in this example. This provides the benefit of coding the adapter receiver 40 for particular types of adapters 42. Furthermore, a particular arrangement of code pins 84 ensures that an adapter is received onto the adapter receiver in a desired orientation rather than in any of multiple different orientations as in previously known adapter assemblies. This provides foolproof assembly between the adapter 42 and the adapter receiver 40.

In the disclosed example, the adapter receiver 40 also includes a valve port 110 having a check valve 112 therein for controlling pressurized air or vacuum that is supplied to the adapter assembly 42. In this example, the valve port 110a includes a spacer 114 that presses against the check valve 112 when the adapter 42 is assembled to the adapter receiver 40. The spacer 114 compresses the check valve 112, thereby opening the check valve 112 to allow fluid to pass there through (e.g., for a vacuum or pressurized air supply). Although the particular adapter 42 shown in the disclosed example does not utilize pressurized air or vacuum, the adapter receiver 40 may include the port 110 and check valve 112 such that other types of adapters 42 that utilize pressurized air or vacuum can be connected easily to a pressurized air or vacuum source.

Although a preferred embodiment of this invention has been disclosed, a worker of ordinary skill in this art would recognize that certain modifications would come within the scope of this invention.

What is claimed is:

1. An adapter assembly for use in an automated handling equipment system, comprising:
   a first component;
   a second component that is selectively mountable to the first component;
   at least one first code member associated with the first component; and
   at least one second code member associated with the second component, wherein the at least one first code member is removably attachable to the first component in multiple different orientations relative to the first component and the at least one second code member is removably attachable to the second component in multiple different orientations relative to the second component such that the at least one first code member and the at least one second code member have variable orientations relative to each other that control whether the second component can be mounted to the first component, and each of the code members includes a male section and a female section, the female section being oriented for use in one of the multiple different orientations of the respective at least one first code member and at least one second code member and the male section being oriented for use in another of the multiple different orientations of the respective at least one first code member and at least one second code member.

2. The adapter assembly as recited in claim 1, wherein the at least one first code member and the at least one second code member mate in one of the variable orientations and do not mate in another of the variable orientations.

3. The adapter assembly as recited in claim 1, wherein the second component mounts to the first component when the female section of the at least one first code member is oriented to receive the male section of the at least one second code member.

4. The adapter assembly as recited in claim 1, wherein the at least one first code member includes a plurality of the first code members and the at least one second code member includes a plurality of the second code members that correspond to the plurality of first code members.

5. The adapter assembly as recited in claim 4, further including a first fastener for securing the plurality of first code members with the first component, and a second fastener for securing the plurality of second code members with the second component.

6. The adapter assembly as recited in claim 4, comprising a number N of the plurality of the first code members and a corresponding number N of the plurality of the second code members, each code member having X number of possible orientations of attachment to the respective first component or the second component such that the code members collectively include $X^N$ possible arrangements.

7. The adapter assembly as recited in claim 1, further including a locking mechanism for locking the first component and the second component together.

8. The adapter assembly as recited in claim 7, wherein the locking mechanism includes a bias mechanism for biasing the locking mechanism toward a locked position.

9. The adapter assembly as recited in claim 1, wherein the first component includes a stem that extends from the first component, and the second component includes an opening for receiving the stem to secure the first component and the second component together.

10. The adapter assembly as recited in claim 9, wherein the stem includes an angled end.

11. The adapter assembly as recited in claim 9, wherein the stem includes a groove.

12. The adapter assembly as recited in claim 11, further including a latch lever for selectively engaging the groove of the stem to lock the first component and the second component together.

13. The adapter assembly as recited in claim 12, wherein the latch lever includes a pivot pin located near one end of the latch lever.

14. The adapter assembly as recited in claim 1, wherein the first component and the second component each include bores for receiving the code members.

15. The adapter assembly as recited in claim 1, wherein at least one of the first component or the second component comprises a fluid passage extending there through, the fluid passage including a check valve.

16. An adapter assembly for use in an automated handling equipment system, comprising:
    a first code member having a male section and a female section; and
    a second code member having a male section and a female section,
    wherein the first code member is removably attachable to a first component in at least a first orientation, in which the male section of the first code member faces outward for engagement with the second code member, and a second orientation, in which the female section of the first code member faces outward for engagement with the second code member, and
    wherein the second code member is removably attachable to a second component in at least a first orientation, in which the female section of the second code member faces outward for engagement with the first code member, and a second orientation, in which the male section of the second code member faces outward for engagement with the first code member.

17. The adapter assembly of claim 16, wherein the male sections of the first code member and the second code member are each configured to couple with the female section of the other of the first code member or the second code member, the male sections of the first code member and the second code member are configured to prevent coupling with one another, and the female sections of the first code member and the second code member are configured to prevent coupling with one another.

18. The adapter assembly of claim 16, wherein the first code member and the second code member cooperate to restrain coupling of the first component with respect to the second component when the first code member is in the first orientation thereof and the second code member is in the second orientation thereof, and the first code member and the second code member cooperate to restrain coupling of the first component with respect to the second component when the first code member is in the second orientation thereof and the second code member is in the first orientation thereof.

19. An adapter assembly for use in an automated handling equipment system, comprising:
    a first component, wherein the first component includes a stem that extends from the first component and the stem includes a groove;
    a second component that is selectively mountable to the first component, wherein the second component includes an opening for receiving the stem of the first component to secure the first component and the second component together;
    at least one first code member associated with the first component;
    at least one second code member associated with the second component, the at least one first code member and the at least one second code member having variable orientations relative to each other that control whether the second component can be mounted to the first component;
    a latch lever for selectively engaging the groove of the stem to lock the first component and the second component together; and
    a spring and a latch pin associated with the spring, where the latch pin extends through one of the first component or the second component such that actuation of the latch pin actuates the spring to pivot the latch lever.

* * * * *